UNITED STATES PATENT OFFICE.

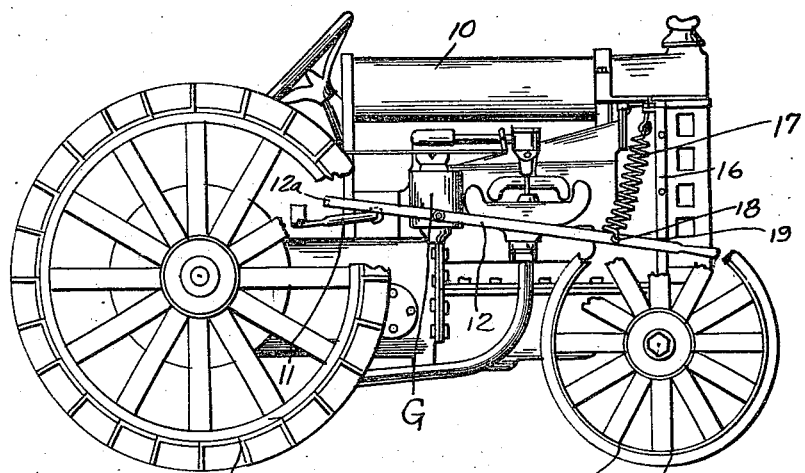
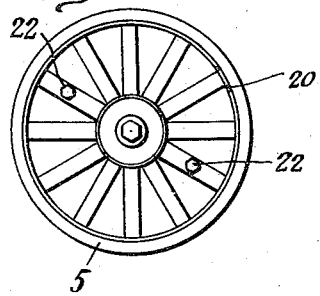
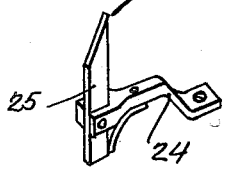
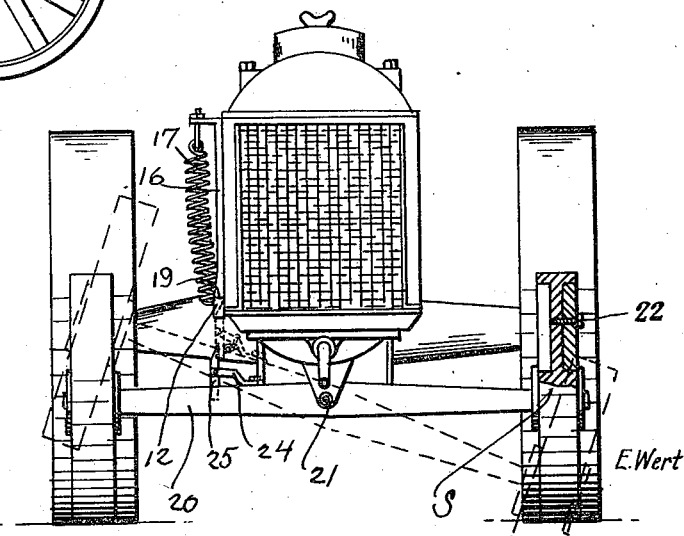

ENOS WERTENBERGER, OF LAKETON, INDIANA.

TRACTOR.

1,421,635.  Specification of Letters Patent.  Patented July 4, 1922.

Application filed May 28, 1921. Serial No. 473,371.

*To all whom it may concern:*

Be it known that I, ENOS WERTENBERGER, a citizen of the United States, residing at Laketon, in the county of Wabash and State of Indiana, have invented certain new and useful Improvements in Tractors, of which the following is a specification, reference being had to the accompanying drawings.

This invention relates to improvements in tractors and has for an important object thereof the provision of means for preventing bucking or rearing of the forward end of the tractor.

A further object of the invention is to provide a device of this character which is operated by the front axle of the tractor. As is well known to those familiar with the art, the front axle of tractors of that type having front supporting wheels and rear driving wheels is usually mounted for oscillation to prevent excessive twisting of the body of the tractor due to inequalities of the surface upon which the tractor may be operating, and in accordance with my invention this oscillatory mounting is taken advantage of to perform the function of releasing the clutch from the final drive to stop the tractor if the oscillation becomes excessive. In order to attain this excessive oscillation upon elevation of the supporting wheels of the front axle from the ground, I provide means associated with the axle for causing such excessive oscillation as will hereinafter more fully appear.

A further object of the invention is to provide a device of the above mentioned character which may be readily applied to the tractors now in use without materially altering the construction thereof.

Other objects and advantages of the invention will become apparent throughout the course of the following description.

In the accompanying drawings wherein for the purpose of illustration is shown a preferred embodiment of my invention, and wherein like reference characters designate like parts throughout:

Figure 1 is a side elevation of a tractor embodying my invention;

Figure 2 is a front elevation thereof; and

Figure 3 is a perspective view of the operating arm and finger.

Referring now more particularly to the drawings, the numeral 10 designates a tractor as a whole, and the numeral 11 the clutch pedal thereof whereby the drive of the tractor as embodied in the usual engine is disconnected from the rear or drive wheels D. In accordance with my invention, I pivot upon the side of the tractor, and more particularly in the type here disclosed commonly known as Fordson, upon the axle tank G thereof, a lever 12, the rear end of which is provided with a foot or angular portion 12$^a$ overhanging the clutch lever 11 and adapted to depress the same when the forward end of the lever 12 is elevated.

Upon the side of the radiator 15 I secure a standard 16, to the upper end of which is secured one end of a spring 17, the lower end of which is connected to the forward end of the lever 12, as at 18. The lower end of the standard 16 is provided with a shoulder 19 against which the bar or lever 12 normally abuts in order to normally prevent elevation of the forward end of the lever by the action of the spring 17.

The numeral 20 indicates a front axle of the tractor which is pivoted to the frame, as at 21, for oscillation so that the supporting wheels S thereof may ride upon rough surfaces without placing undue strain upon the frame. In accordance with my invention means is applied to cause one end of the axle 20 to be depressed when both front supporting wheels are elevated from the ground, and more particularly that end of the axle which is disposed at the side of the tractor remote from the clutch operating lever 11 and lever 12. In the present instance this is accomplished by securing to the spokes of the supporting wheel S counterweights 22. When the wheels are elevated from the ground the wheel at this end of the axle will be the heavier and will accordingly cause the axle to rotate about its pivot. To the opposite side of the axle I secure an arm 24 having an operating finger 25 adapted to engage the bar or lever 12 upon excessive oscillation of the axle 20 and release the same from the shoulder 19 of the support 16 and allow the lever to be drawn upwardly under the influence of the spring 17, depressing the clutch pedal and disconnecting the drive from the driving wheels D. It will accordingly be seen that if the front end of the tractor be elevated from the ground as when the load drawn by the tractor is excessive, the axle 20 will oscillate bringing the finger 25 of the arm 24 into play to release the lever 12 and disconnect the clutch, allowing the tractor to resume its proper position.

Many changes being possible in the shape, size and arrangement of the various parts hereinbefore set forth without in any manner departing from the spirit of my invention, I do not limit myself to the specific structure thereof except as hereinafter claimed.

I claim:

1. The combination with a tractor embodying the usual drive, rear power axle, clutch operating lever for connecting and disconnecting the drive to and from the power axle and front axle pivoted for oscillation, of a pivoted lever mounted at the side of the tractor and engaging said clutch at its rear end and adapted to shift the clutch to disconnect the drive from the power axle when the front end thereof is elevated, means tending to elevate the front end of the lever, means preventing such elevation, and means carried by the front axle and coacting with the lever to release the same from the last named means when the supporting wheels of the front axle are elevated from the ground.

2. The combination with a tractor embodying the usual drive, rear power axle, clutch operating lever for connecting and disconnecting the drive to and from the power axle and front axle pivoted for oscillation, of means for shifting the clutch operating lever to disconnect the drive from the front axle upon excessive oscillation of the front axle, and counterweights secured to one of the supporting wheels of said front axle whereby to cause excessive oscillation thereof when the supporting wheels are elevated from the ground.

3. The combination with a tractor embodying a clutch operating lever, of a bar pivoted to the tractor forwardly of the clutch operating lever and provided with a portion overhanging such lever, means connected with the bar at the forward end thereof tending to elevate the forward end, a lug carried by the tractor against which said forward end engages, means carried by the front axle for releasing said bar from said lug upon excessive oscillation of the front axle, and means for causing such excessive oscillation of the front axle upon elevation of the supporting wheels thereof from the ground.

4. The combination with a tractor embodying the usual drive, rear power axle, clutch operating lever for connecting and disconnecting the drive to and from the power axle and continuous front axle pivoted for oscillation and provided at the ends thereof with supporting wheels, of a pivoted lever having the work arm thereof engaged with the clutch operating lever and adapted when moved in one direction to shift the clutch operating lever to disconnect the drive from the power axle, means engaged with the power arm of the lever for moving the lever in said direction, means engaging the power arm for preventing such movement, means for disengaging the power arm of the lever from said means upon excessive oscillation of the front axle, and means for causing such excessive oscillation of the front axle upon elevation of the supporting wheels thereof from the ground.

In testimony whereof I hereunto affix my signature.

ENOS WERTENBERGER.